(12) United States Patent
Vemuri et al.

(10) Patent No.: US 8,639,808 B1
(45) Date of Patent: Jan. 28, 2014

(54) METHOD AND APPARATUS FOR MONITORING STORAGE UNIT OWNERSHIP TO CONTINUOUSLY BALANCE INPUT/OUTPUT LOADS ACROSS STORAGE PROCESSORS

(75) Inventors: Hari Krishna Vemuri, Pune (IN); Shailesh Vaman Marathe, Pune (IN)

(73) Assignee: Symantec Corporation, Mountain View, CA (US)

( * ) Notice: Subject to any disclaimer, the term of this patent is extended or adjusted under 35 U.S.C. 154(b) by 875 days.

(21) Appl. No.: 12/346,390

(22) Filed: Dec. 30, 2008

(51) Int. Cl.
*G06F 15/173* (2006.01)
*G06F 15/177* (2006.01)

(52) U.S. Cl.
USPC .................................. 709/225; 709/221

(58) Field of Classification Search
USPC .................................. 709/221, 225
See application file for complete search history.

(56) References Cited

U.S. PATENT DOCUMENTS

| | | | | |
|---|---|---|---|---|
| 5,860,137 | A * | 1/1999 | Raz et al. | 711/202 |
| 6,173,306 | B1 * | 1/2001 | Raz et al. | 718/102 |
| 7,296,068 | B1 * | 11/2007 | Sarma et al. | 709/223 |
| 7,406,484 | B1 * | 7/2008 | Srinivasan et al. | 1/1 |
| 7,509,646 | B1 * | 3/2009 | Maw et al. | 718/105 |
| 7,529,887 | B1 * | 5/2009 | Haase et al. | 711/114 |
| 7,707,263 | B1 * | 4/2010 | Cramer et al. | 709/212 |
| 7,711,683 | B1 * | 5/2010 | Watanabe et al. | 711/100 |
| 7,788,361 | B2 * | 8/2010 | sen Sarma et al. | 709/223 |
| 7,797,570 | B2 * | 9/2010 | Pittman | 714/5.11 |
| 7,809,693 | B2 * | 10/2010 | Lango et al. | 707/679 |
| 7,930,587 | B1 * | 4/2011 | Coatney et al. | 714/6.32 |
| 2003/0120743 | A1 * | 6/2003 | Coatney et al. | 709/217 |
| 2004/0236798 | A1 * | 11/2004 | Srinivasan et al. | 707/200 |
| 2005/0172097 | A1 * | 8/2005 | Voigt et al. | 711/170 |
| 2006/0206671 | A1 * | 9/2006 | Aiello et al. | 711/148 |
| 2008/0021992 | A1 * | 1/2008 | Sarma et al. | 709/223 |

OTHER PUBLICATIONS

"Sun StorageTek MPIO Device Specific Module," Copyright 2008 Sun Microsystems, Inc. Downloaded from web site http://docs.sun.com/source/820-4737-11/chapsing.html on May 6, 2009.
"HP StorageWorks MSA1500 for HP-UX white paper—Best practices for an effective SAN deployment with HP-UX," Copyright 2007 Hewlett-Packard Development Company, LP. Downloaded from web site http://h71028.www7.hp.com/ERC/downloads/4AA1-1984ENW.pdf on May 6, 2009.
Mehis, Arrian and Stanford, Scott, "Designing and Optimizing—Dell/EMC SAN Configurations Part 1," Jun. 2004, pp. 94-98.

(Continued)

*Primary Examiner* — Tauqir Hussain
*Assistant Examiner* — Ebrahim Golabbakhsh
(74) *Attorney, Agent, or Firm* — Campbell Stephenson LLP (57) ABSTRACT

A method and apparatus for monitoring storage unit ownership to continuously balance input/output loads across storage processors is provided. In one embodiment, a method for rebalancing loads across a plurality of storage processors using storage unit ownership information includes accessing ownership information between a plurality of storage units and a plurality of storage processors within a storage subsystem and in response to a load imbalance across the plurality of storage processors, modifying storage unit ownership of at least one storage unit of the plurality of storage units from a storage processor of the plurality of storage processors to another storage processor of the plurality of storage processors based on the ownership information.

21 Claims, 3 Drawing Sheets

(56) References Cited

OTHER PUBLICATIONS

"Information Playground—Building Software for the Information Storage Industry: Testing CLARiiON's Write Cache," Jun. 11, 2008. Downloaded from web site http://stevetodd.typepad.com/my_weblog/2008/06/testing-clariio.html on May 6, 2009.

"Dell™ PowerEdge™ Cluster SE600Wi Systems Important Information," Aug. 2007. Downloaded from web site http://support.dell.com/support/edocs/systems/clusters/SE600Wi/en/imp_info_en/info_en.pdf on May 6, 2009.

* cited by examiner

METHOD AND APPARATUS FOR MONITORING STORAGE UNIT OWNERSHIP TO CONTINUOUSLY BALANCE INPUT/OUTPUT LOADS ACROSS STORAGE PROCESSORS

BACKGROUND

1. Field of the Invention

Embodiments of the present invention generally relate to Storage Area Network (SAN) management and, more particularly, to a method and apparatus for monitoring storage unit ownership to continuously balance input/output loads and dynamically optimize storage unit distribution across storage processors.

2. Description of the Related Art

In a conventional computing environment, an organization may employ a number of technologies to process and store mission critical data. For example, the conventional computing environment may include one or more data storage systems for facilitating permanent storage, retrieval and transmission of the mission critical data throughout a storage area network. Typically, a Storage Area Network (SAN) includes a plurality of storage units (e.g., hard disk drives, optical drives, magnetic tape drives, a storage array (e.g., a RAID configuration) and/or the like) that facilitates permanent storage of mission critical data as well as software for managing performance of input/output operations on the plurality of storage units.

For example, a storage array (e.g., a disk array) may be partitioned into the plurality of storage units (e.g., storage volumes) where each storage unit is represented by a Logical Unit Number (LUN). The LUN is utilized to uniquely identify the storage unit such that input/output operations can be directed to the storage device. The input/output requests are processed by multiple storage processors. Collectively, the multiple storage processors are dedicated processors that perform various input/output operations on the plurality of LUNs.

For each storage unit (LUN) in a storage array with asymmetric storage unit (LUN) access (e.g., an active/passive array, an ALUA array and/or the like), only one of the storage processors is active (owner) while the other storage processor remains passive (non-owner). A plurality of LUNs are distributed across the storage processors such that each of the storage processor is equally loaded. The distribution of the plurality of LUNs across the storage processors is static and such distribution may not be optimal as the SAN may require reconfiguration from time to time due to various events such as a failure in connection with host computer. As a result, the initial load balance of the storage processors is disturbed.

Occasionally, there may be a failure within a SAN that includes the host computer and the owner storage processor of the plurality of LUNs. Due to such a network connectivity loss or an available network bandwidth reduction, the host computer needs to change the storage unit ownership of the plurality of LUNs to the non-owner storage processor (i.e., a network reconfiguration). As a result, the load balance of the storage processors is disturbed. For example, if the host computer is connected to the owner storage processor through more than one connection where one connection is lost, then the host computer can continue to use the owner storage processor but will experience a reduction in an available network bandwidth. If, however, the host computer proactively modifies the storage unit ownership to the non-owner storage processor which uses a different SAN connection, then the available network bandwidth is restored. The storage array cannot modify the ownership of the plurality of LUNs autonomously because the storage array cannot determine which of the various initiators using the plurality of LUNs belong to the same host computer application that causes a current input/output load.

Therefore, there is a need in the art for a method and apparatus for monitoring storage unit ownership to continuously balance input/output loads and dynamically optimize storage unit distribution across storage processors.

SUMMARY OF THE INVENTION

Embodiments of the present invention comprise a method and apparatus for monitoring storage unit ownership to continuously balance input/output loads across storage processors. In one embodiment, a method for rebalancing loads across a plurality of storage processors using storage unit ownership information includes accessing ownership information between a plurality of storage units and a plurality of storage processors within a storage subsystem and in response to a load imbalance across the plurality of storage processors, modifying storage unit ownership of at least one storage unit of the plurality of storage units unit from a storage processor of the plurality of storage processors to another storage processor of the plurality of storage processors based on the ownership information.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
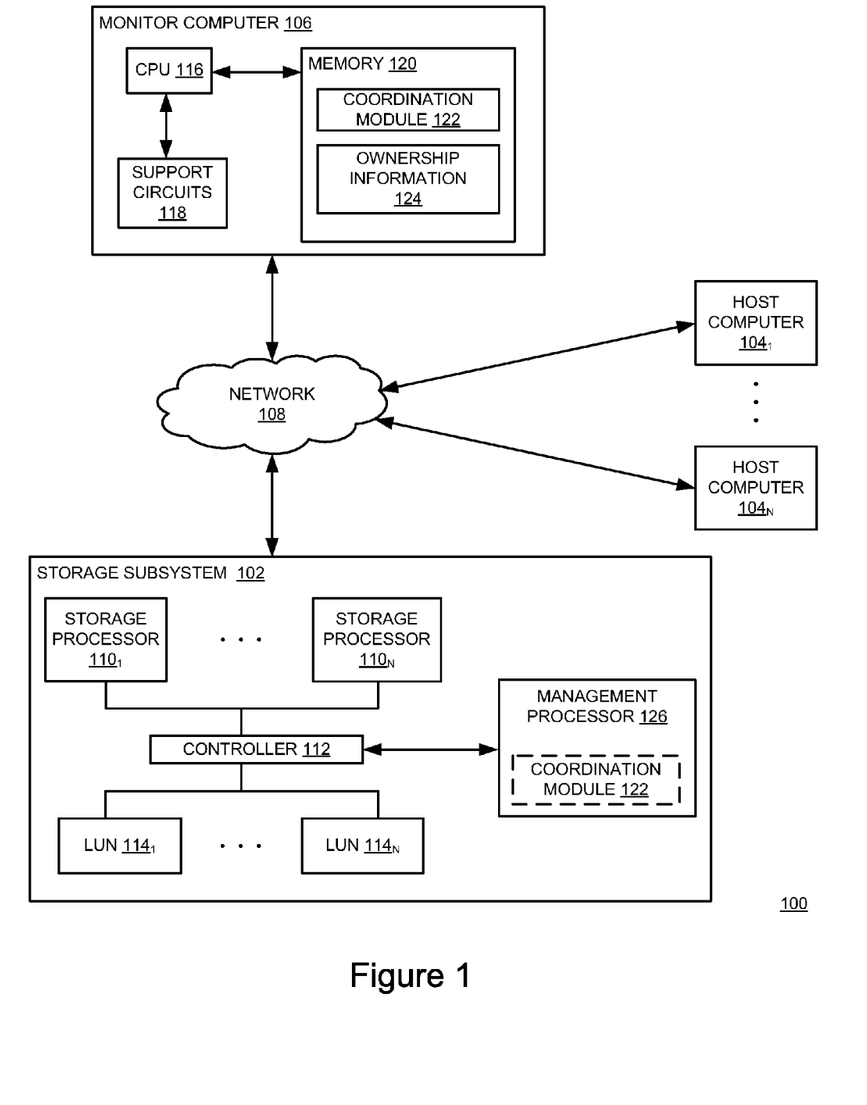
FIG. 1 is a block diagram of a system for monitoring storage unit ownership to balance input/output loads across storage processors, according to various embodiments of the present invention.

FIG. 1 is a block diagram of a system 100 for monitoring storage unit ownership to balance input/output loads across storage processors according to various embodiments of the present invention. The system 100 comprises a storage subsystem 102, a monitor computer 106, a plurality of host computers 104 (illustrated as a host computer $104_1$ ... a host computer $104_N$) where each is coupled to each other through a network 108.

The storage subsystem 102 generally includes various components (i.e., hardware and software) that are configured to manage storage resources within a computing environment. The storage subsystem 102 facilitates permanent storage (i.e., backup) of critical computer data. Generally, the storage subsystem 102 includes one or more data storage devices (e.g., hard disk drives, optical drives, magnetic tape drives, a storage array (e.g., a RAID configuration) and/or the like), one or more controllers and software that provides an interface (e.g., Integrated Drive Electronics/AT Attachment (IDE/ATA), Small Computer Systems Interface (SCSI) and/ or the like) to the one or more data storage devices for the plurality of host computers 104. For example, a storage array (e.g., a disk array) may be partitioned into a plurality of storage units (e.g., storage volumes) where each storage unit is represented by a Logical Unit Number (LUN).

The plurality of host computers 104 are various types of computing devices (e.g., a laptop, a desktop, a Personal Digital Assistant (PDA) and/or the like), such as those generally known in the art. The plurality of host computers 104 may provide access to the storage subsystem 102. As explained further below, the plurality of host computers 104 are configured to perform various input/output operations on the storage subsystem 102. For example, each host computer of the plurality of host computers 104 includes one or more initiators (e.g., host adapters) for communicating the various input/ output operations to a particular storage unit in the storage subsystem 102.

The monitor computer 106 is a type of computing device (e.g., a laptop, a desktop, a Personal Digital Assistant (PDA) and/or the like), such as those generally known in the art. The monitoring computer 106 includes a Central Processing Unit (CPU) 116, various support circuits 118 and a memory 120. The CPU 116 may comprise one or more commercially available microprocessors or microcontrollers that facilitate data processing and storage. The various support circuits 118 facilitate the operation of the CPU 116 and include one or more clock circuits, power supplies, cache, input/output circuits, and the like. The memory 120 comprises at least one of Read Only Memory (ROM), Random Access Memory (RAM), disk drive storage, optical storage, removable storage and/or the like. The memory 120 includes a coordination module 122 and ownership information 124.

The network 108 comprises a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the internet or intranet using various communications infrastructure such as Ethernet, WiFi, WiMax, General Packet Radio Service (GPRS), and the like. Furthermore, the network 106 may form a portion of a Storage Network Area (SAN) using various communications infrastructure such as Ethernet, Fibre Channel, InfiniBand, Internet Small Computer System Interface (iSCSI) and the like.

In one embodiment, the storage subsystem 102 includes a plurality of storage processors 110 (illustrated in FIG. 1 as a storage processor $110_1$ ... a storage processor $110_N$) that are coupled to a controller 112. In one embodiment, the plurality of storage processors 110 may comprise one or more commercially available microprocessors or microcontrollers (e.g., a storage array) that facilitate data processing and storage to the plurality of storage units for the plurality of host computers 104. In one embodiment, a particular storage processor of the plurality of storage processors includes multiple physical processors.

In one embodiment, the plurality of storage processors 110 includes one or more owner storage processors as well as one or more non-owner storage processors. For each storage unit of the plurality of storage units, an owner storage processor may be referred to as a primary storage processor and a non-owner storage processor may be referred to a secondary storage processor. A storage processor is assigned a role of primary or secondary. After a storage unit ownership modification, the roles of the owner storage processor and the non-owner storage processor are switched.

In one embodiment, a particular storage unit of the plurality of storage units may be assigned to a storage processor (i.e., an owner storage processor) of the plurality of storage processors 110. A host computer of the plurality of host computer 104 may communicate with the storage processor through a plurality of connections. As such, the storage processor performs one or more input/output operations, while another storage processor (i.e., a non-owner storage processor) remains idle. Subsequently, a failure may occur that causes a network connectively loss or a reduction in available network bandwidth.

As a result, the storage processor is failed over to the other storage processor to restore accessibility to the particular storage unit (i.e., network reconfiguration). Hence, the other storage processor resumes performance of the one or more input/output operations, which causes an input/output load imbalance across the plurality of storage processors 110. In response, the coordination module 122 rebalances a load by modifying the storage unit ownership of another storage unit that is owned by the other storage processor and accessible by each and every host computer of the plurality of host computers 104 that use the other storage unit through the storage processor of the plurality of storage processors 110 as described further below.

In one embodiment, the storage subsystem 102 includes a plurality of LUNs 114 (illustrated in FIG. 1 as a LUN $114_1$ ... a LUN $114_N$) that represent the plurality of storage units where each LUN of the plurality of LUNs 114 is coupled to the plurality of storage processors 110 through a controller 112. The host computers 104 perform various input/output operations on the LUN 114 via the controller 112. In one embodiment, the controller 112 manages such input/output operations between the plurality of storage processors 110 and the plurality of LUNs 114. Furthermore, each of the plurality of LUNs 114 is assigned to one or more storage processors of the plurality of storage processors 110 (i.e., storage unit ownership). For example, a particular LUN may be assigned to an owner storage processor to indicate storage unit ownership.

According to various embodiments, the CPU 116 executes the coordination module 122 stored in the memory 120 to monitor storage unit ownership to balance input/output loads and optimize LUN distribution across the plurality of storage processors 110. In one embodiment, the coordination module 122 includes software code that is configured to access the ownership information 124 and modify the storage unit ownership of one or more LUNs of the plurality of LUNs 114 from a storage processor to another storage processor in response to an input/output load imbalance across the plurality of storage processors 112. The coordination module 122 cooperates with the storage subsystem 102 and/or the plurality of host computers 104 to generate the ownership information 124, which may be used to identify a network reconfiguration or an input/output load shift that causes the input/ output load imbalance. For example, the coordination module 122 accesses the ownership information 124 to identify a network connectivity loss or an available network bandwidth reduction that causes the network reconfiguration.

According to various embodiments, the ownership information 124 includes mappings that indicate storage unit ownership between the plurality of LUNs 114 and the plurality of storage processors 110. In one embodiment, such mappings may be examined in order to determine a storage unit ownership of a LUN of the plurality of LUNs 114. For example, the ownership information 124 may be utilized to access a mapping between a particular LUN and an owner storage processor. Such a mapping represents a storage unit ownership of the particular LUN by the owner storage processor. Accordingly, the owner storage processor is utilized to perform various input/output operations on the particular LUN. In one embodiment, the coordination module 122 processes mappings between the plurality of LUNs 114 and the plurality of storage processors 110 that are provided by the plurality of host computers 104.

In another embodiment, the ownership information 124 includes loads associated with the plurality of storage processors 110 based on input/output traffic between the plurality of host computers 104 and the plurality of LUNs 114. The coordination module 122 determines a load on each of the plurality of storage processors 110 based on one or more LUNs of the plurality of LUNs 114 that are assigned to (i.e., owned by) the each storage processor of the plurality of storage processors 110. For example, a load on a particular storage processor of the plurality of storage processors 110 may be a sum of each load on one or more owned LUNs of the plurality of LUNs 114. Alternatively, the coordination module 122 determines the load on the particular storage processor of the plurality of storage processors 110 based on a number of the one or more owned LUNs of the plurality of LUNs 114.

In one or more embodiments, the load on the one or more LUNs of the plurality of LUNs 114 is computed on a basis of an input/output traffic directed to the plurality of LUNs 114 from one or more host computers of the plurality of host computers 104 that share the one or more LUNs of the plurality of LUNs 114. Such input/output traffic may be aggregated from using host input/output statistics provided by the one or more host computers of the plurality of host computers 104 according to one embodiment. In another embodiment, the input/output traffic may be computed by the particular storage processor of the plurality of storage processors 110.

In one embodiment, the coordination module 122 monitors input/output loads on the plurality of storage processors 110. In one embodiment, the coordination module 122 determines a load imbalance based on the input/output traffic. According to various embodiments, the coordination module 122 determines a difference in the input/output loads on the plurality of storage processors 110. Such a load difference may be a result of a network (SAN) reconfiguration due to a network connectivity loss or an available network bandwidth reduction as well as a shift in an input/output load pattern. Hence, the input/output load difference that exceeds a user-defined threshold denotes the shift in the input/output load.

In one embodiment, the coordination module 122 selects one or more LUNs of the plurality of LUNs 114 of which a storage unit ownership is to be modified from a storage processor to another storage processor based on the ownership information 124. For example, starting from the one or more LUNs of the plurality of LUNs 114 owned by the storage processor having a higher load, the coordination module 122 identifies one or more LUNs of the plurality of LUNs 114 that have the same accessibility from host computers 104 to the storage processor having a lower load. Each of the accessible one or more LUNs has an assigned weight (e.g., an input/output load). From the one or more accessible LUNs, the coordination module 122 selects one or more LUNs 114 that are to be migrated to the storage processor 110 having the lower load in order to restore the load balance across the plurality of storage processors.

As an example and not as a limitation, a storage processor (i.e., a non-owner storage processor) of the plurality of storage processors 110 may be idle while a host computer of the plurality of the host computers 104 requests that numerous input/output operations be performed on a LUN of the plurality of LUNs 114 using another storage processor (i.e., an owner storage processor) of the plurality of storage processors 110. Accordingly, the controller 112 directs the numerous input/output operations to the other storage processor. If there is a network connectivity loss or an available network bandwidth reduction between the host computer of the plurality of the host computers 104 and the other storage processor of the plurality of storage processors 110, the numerous input/output operations may failover from the other storage processor to the storage processor of the plurality of storage processors 110 in order to reconfigure a Storage Area Network (SAN). For instance, a primary path may be failed over to a secondary path to restore the available network bandwidth for the numerous input/output operations.

In response to an input/output load imbalance that results from the SAN reconfiguration, the coordination module 122 modifies storage unit ownership of one or more LUNs of the plurality of LUNs 114 from the storage processor of the plurality of storage processors 110 to the other storage processor of the plurality of storage processors 110 according to various embodiments. Furthermore, the one or more LUNs of the plurality of LUNs 114 are accessible to one or more host computers of the plurality of host computers 104 through the other storage processor. Subsequently, the coordination module 122 updates the ownership information 124 to reflect the storage unit ownership modification.

In one embodiment, the coordination module 122 instructs one or more host computers of the plurality of host computers 104 to modify the storage unit ownership of the one or more LUNs of the plurality of LUNs 114 to restore the balance according to one embodiment. For example, the coordination module 122 may instruct the one or more host computers of the plurality of host computers 104 to issue one or more failover commands to the storage subsystem 102 in order to migrate the one or more LUNs of the plurality of LUNs 114 from a storage processor to another storage processor of the plurality of storage processors 110. As a result, the various input/output operations are failed over from the storage processor to the other storage processor (e.g., migrated).

In another embodiment, the coordination module 122 instructs the controller 112 to modify the storage unit ownership of the one or more LUNs of the plurality of LUNs 114 from the storage processor to the other storage processor. Subsequently, the plurality of host computers 104 adjust to the storage unit ownership modification. In one embodiment, the controller 112 communicates one or more Small Computer System Interface (SCSI) response notifications, such as a UNIT ATTENTION command, to one or more host computers of the plurality of host computers 104. Alternatively, the controller 112 communicates a response to a query from the host computer of the plurality of host computers 104 that indicates the storage unit ownership modification.

Alternatively, the storage subsystem 102 further includes a management processor 126. According to various embodiments, the management processor 126 may comprise one or more commercially available microprocessors or microcontrollers that facilitate data processing and storage. Optionally, the management processor 126 includes the coordination module 122 for modifying storage unit ownership to rebalance loads across the plurality of storage processors 110. In one optional embodiment, the coordination module 122 processes the mappings between initiators that share an application that uses one or more LUNs of the plurality of LUNs 114 from the plurality of storage processors 110. A mapping for the application may be obtained from a host computer of the plurality of host computers 104 or provided by a designated key value (e.g., a Persistent Group Reservation value in accordance with SCSI architecture) that is registered with the plurality of storage processors 110 through the initiators that share the application.

In one optional embodiment, the coordination module 122 within the management processor 126 determines a load imbalance caused by a network connectively loss or an input/output load shift. In response to the load imbalance, the coordination module 122 modifies storage unit ownership of the one or more LUNs of the plurality of LUNs 114 to restore the load balance as explained above. For example, the coordination module 122 may instruct the controller 112 to migrate the one or more LUNs of the plurality of LUNs 114 from a storage processor to another storage processor. In one optional embodiment, the controller 112 communicates a SCSI response notification to a host computer of the plurality of host computers 104 that indicates the storage unit ownership modification. Alternatively, the controller 112 communicates a response to a query from the host computer of the plurality of host computers 104 that indicates the storage unit ownership modification.

Figure 2:
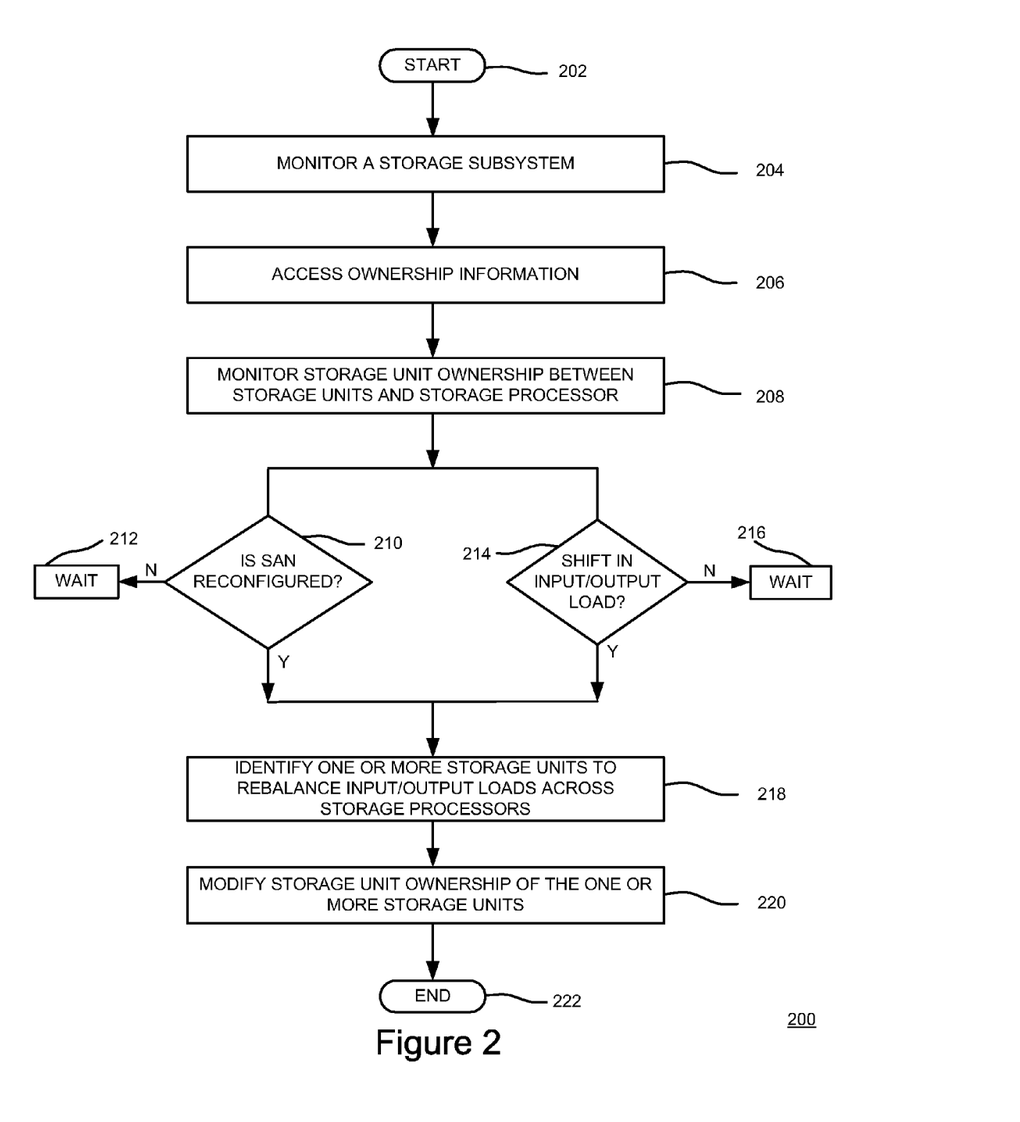
FIG. 2 is a flow diagram of a method for monitoring storage unit ownership to balance input/output loads across storage processors, according to various embodiments of the present invention.

FIG. 2 is a flow diagram of a method 200 for monitoring storage unit ownership to balance input/output loads across storage processors according to one embodiment. The method 200 starts at step 202 and proceeds to step 204, at which a storage subsystem (e.g., the storage subsystem 102 of FIG. 1) is monitored.

At step 206, ownership information (e.g., the ownership information 124 of FIG. 1) is accessed. At step 208, storage unit ownership between storage units (e.g., the plurality of LUNs 114 of FIG. 1) and storage processors (e.g., the plurality of storage processors 110 of FIG. 1) is monitored. In one embodiment, the input/output loads on the storage processors are examined. The method 200 proceeds to step 210 and step 214 in parallel.

At step 210, a determination is made as to whether a SAN is reconfigured (e.g., due to a network connectivity loss or an available network bandwidth reduction). If, it is determined that the SAN is reconfigured (option "YES") then the method 200 proceeds to step 218. If, at step 210, it is determined that the SAN is not reconfigured (option "NO") then the method 200 proceeds to step 212. At step 212, the method 200 waits for the SAN to reconfigure. At step 214, a determination is made as to whether there is a shift in an input/output load. If it is determined that there is a shift in the input/output load (option "YES"), then the method 200 proceeds to step 218.

If, at step 214, it is determined that there is no shift in the input/output load (option "NO"), then the method 200 proceeds to step 216. At step 216, the method 200 waits for the input/output load to shift. At step 218, one or more storage units are identified to rebalance input/output loads across the storage processors. At step 220, storage unit ownership of the one or more storage units is modified. The method 200 proceeds to step 222, where the method 200 ends.

Figure 3:
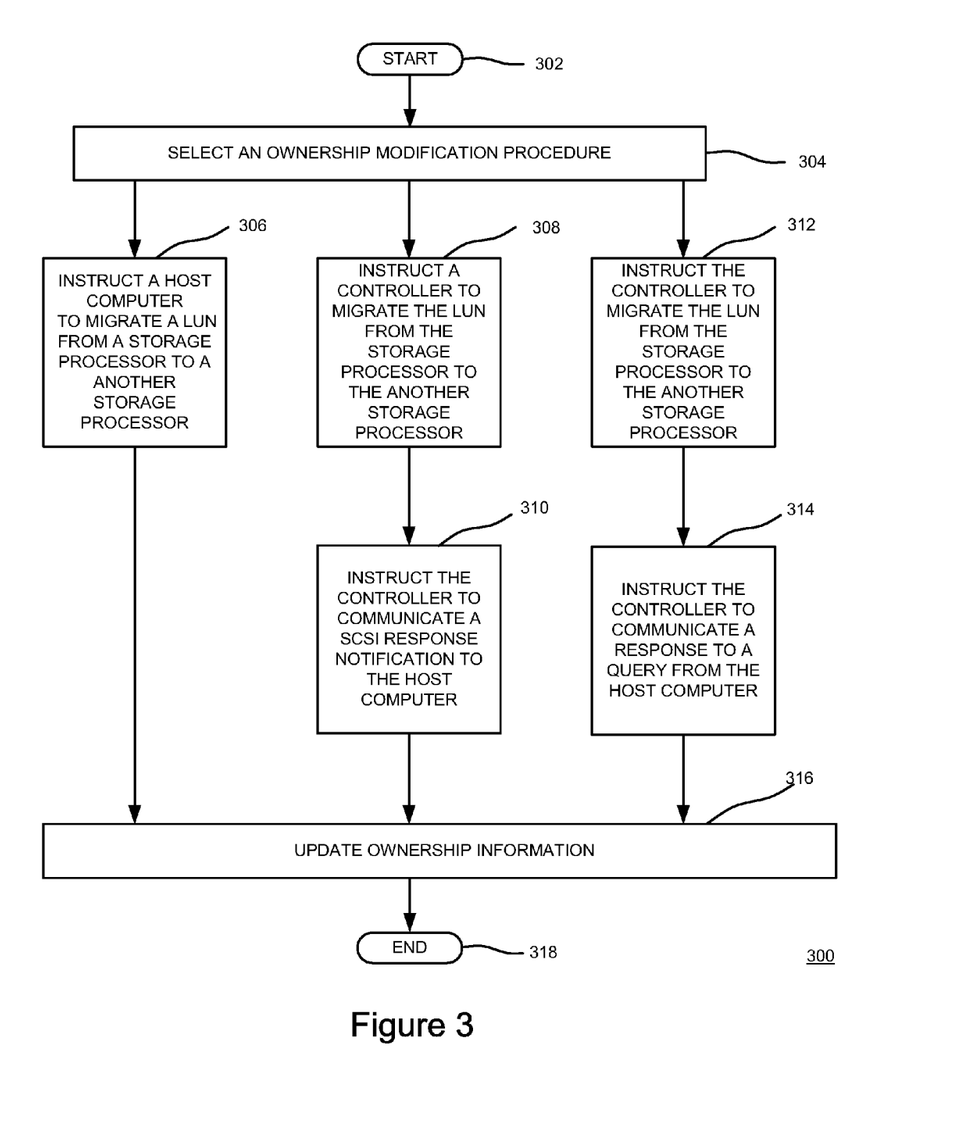
FIG. 3 is a flow diagram of a method for modifying storage unit ownership of a LUN from a storage processor to another storage processor to restore an input/output load balance, according to various embodiments of the present invention.

FIG. 3 is a flow diagram of a method 300 for modifying storage unit ownership of a LUN from a storage processor to another storage processor to restore an input/output load balance according to one embodiment. The method 300 starts at step 302 and proceeds to step 304, at which a storage unit ownership modification procedure is selected. In one embodiment, a coordination module (e.g., the coordination module 122 of FIG. 1) selects the storage unit ownership modification procedure.

In one embodiment, a first storage unit ownership modification procedure is selected and the method 300 proceeds to step 306. At step 306, a host computer (e.g., the host computer 104 of FIG. 1) is instructed to migrate a LUN from a storage processor to another storage processor. In one embodiment, the host computer is instructed to issue failover commands to perform the migration. After the step 306, the method 300 proceeds to step 316. In another embodiment, a second storage unit ownership modification procedure is selected and the method 300 proceeds to step 308. At step 308, a controller (e.g., the controller 112 of FIG. 1) is instructed to migrate the LUN from the storage processor to the other storage processor. In one embodiment, the controller may be coupled to a plurality of LUNs in a storage array. At step 310, the controller is instructed to communicate a Small Computer System Interface (SCSI) response notification to the host computer. After the step 310, the method 300 proceeds to step 316.

In yet another embodiment, a third storage unit ownership modification procedure is selected and the method 300 proceeds to step 312. In one embodiment, the third storage unit ownership modification procedure is employed by a management processor (e.g., the management processor 126 of FIG. 1) within the storage array. At step 312, the controller is instructed to migrate the LUN from the storage processor to another storage processor. In one embodiment, the coordination module within the management processor instructs the controller to migrate the LUN from the storage processor to the other storage processor. At step 314, the controller is instructed to communicate a response to a query from the host computer. As a result, the host computer adjusts to the storage unit ownership modification. The method 300 proceeds to step 316. At step 316, ownership information is updated. The method 300 proceeds to step 318, where the method 300 ends.

While the foregoing is directed to embodiments of the present invention, other and further embodiments of the invention may be devised without departing from the basic scope thereof, and the scope thereof is determined by the claims that follow.

The invention claimed is:

1. A method comprising:
 receiving ownership information at a coordination module from a host computer of a plurality of host computers, wherein
  the ownership information comprises mappings between a plurality of storage units and a plurality of storage processors within a storage subsystem,
  the plurality of host computers is configured to direct input/output operations to the plurality of storage units via the plurality of storage processors, and
  the plurality of host computers is configured to communicate with the plurality of storage processors over one or more network connections; and
 monitoring storage unit ownership, wherein
  the monitoring is performed by the coordination module;
 detecting whether a load imbalance exists, wherein
  the load balance results from a set of conditions comprising at least one of a network reconfiguration or an input/output load shift;
 in response to the detecting,
  identifying one or more storage units to be migrated from a first storage processor of the plurality of storage processors to a second storage processor of the plurality of storage processors, and
  modifying storage unit ownership of the one or more storage units, wherein
   the identifying and the modifying are performed by the storage controller.

2. The method of claim 1, wherein accessing the ownership information further comprising determining loads on the plurality of storage processors based on input/output traffic between the plurality of host computers and the plurality of storage units.

3. The method of claim 1, wherein accessing the ownership information further comprising determining a load on a particular storage processor of the plurality of storage processors based on a number of owned storage units of the plurality of storage units.

4. The method of claim 1, wherein accessing the ownership information further comprises identifying a network reconfiguration between the plurality of host computers and the plurality of storage processors, wherein the network reconfiguration causes the load imbalance.

5. The method of claim 4, wherein identifying the network reconfiguration further comprises identifying at least one of a network connectivity loss or an available network bandwidth reduction between the host computer of the plurality of host computers and the plurality of storage processors.

6. The method of claim 5, wherein the host computer of the plurality of host computers fails over a storage unit of the plurality of storage units from the another storage processor of the plurality of storage processors to the storage processor of the plurality of storage processors due to the at least one of the network connectivity loss or the available network reduction bandwidth reduction.

7. The method of claim 1, wherein modifying the storage unit ownership further comprises instructing the host computer of the plurality of host computers to migrate the at least one storage unit of the plurality of storage units from the storage processor of the plurality of storage processors to the another storage processor of the plurality of storage processors.

8. The method of claim 1, wherein modifying the storage unit ownership further comprises instructing a controller associated with the plurality of storage units to migrate the at least one storage unit of the plurality of storage units from the storage processor of the plurality of storage processors to the another storage processor of the plurality of storage processors.

9. The method of claim 1, wherein modifying the storage unit ownership further comprises selecting the at least one storage unit of the plurality of storage units based on the ownership information.

10. An apparatus comprising:
at least one central processing unit (CPU); and
a memory coupled to the at least one CPU, comprising program instructions executable by the at least one CPU to implement a coordination module configured to
receive ownership information at a coordination module from a host computer of a plurality of host computers, wherein
the ownership information comprises mappings between a plurality of storage units and a plurality of storage processors within a storage subsystem,
the plurality of host computers is configured to direct input/output operations to the plurality of storage units via the plurality of storage processors, and
the plurality of host computers is configured to communicate with the plurality of storage processors over one or more network connections,
monitor storage unit ownership, wherein
monitoring the storage unit ownership is performed by the coordination module,
detect whether a load imbalance exists, wherein
the load balance results from a set of conditions comprising at least one of a network reconfiguration or an input/output load shift, and
in response to detecting the load imbalance
identify one or more storage units to be migrated from a first storage processor of the plurality of storage processors to a second storage processor of the plurality of storage processors, and
modify storage unit ownership of the one or more storage units.

11. The apparatus of claim 10, wherein the coordination module determines loads on the plurality of storage processors based on input/output traffic between the plurality of host computers and the plurality of storage units.

12. The apparatus of claim 11, wherein the coordination module monitors the plurality of storage processors to determine the load imbalance.

13. The apparatus of claim 11, wherein the coordination module identifies a network reconfiguration between the plurality of host computers and the plurality of storage processors, wherein the network reconfiguration indicates the load imbalance.

14. The apparatus of claim 13, wherein the network reconfiguration is caused by a network connectivity loss or an available network bandwidth reduction between the host computer of the plurality of host computers and the first storage processor of the plurality of storage processors.

15. The apparatus of claim 11, wherein the coordination module instructs the host computer of the plurality of host computers to migrate the at least one storage unit of the plurality of storage units from the first storage processor of the plurality of storage processors to the second storage processor of the plurality of storage processors.

16. The apparatus of claim 11, wherein the coordination module instructs a controller associated with the plurality of storage units to migrate the one or more storage units from the first storage processor of the plurality of storage processors to the second storage processor of the plurality of storage processors.

17. A system comprising:
a storage subsystem, comprising a plurality of storage units owned by a plurality of storage processors;
a plurality of host computers for performing input/output operations on the plurality of storage units through the plurality of storage processors; and
a coordination module configured to
receive ownership information from a host computer of a plurality of host computers, wherein
the ownership information comprises mappings between the plurality of storage units and the plurality of storage processors within the storage subsystem,
the plurality of host computers is configured to direct input/output operations to the plurality of storage units via the plurality of storage processors, and
the plurality of host computers is configured to communicate with the plurality of storage processors over one or more network connections,
monitor storage unit ownership, wherein
monitoring the storage unit ownership is performed by the coordination module,
detect whether a load imbalance exists, wherein
the load balance results from a set of conditions comprising at least one of a network reconfiguration or an input/output load shift, and in response to detecting the load imbalance
identify one or more storage units to be migrated from a first storage processor of the plurality of storage processors to a second storage processor of the plurality of storage processors, and
modify storage unit ownership of the one or more storage units.

18. The system of claim 17 further comprising a monitor computer that comprises the coordination module.

19. The system of claim 17, wherein the storage subsystem further comprises a management processor, wherein the management processor comprises the coordination module.

20. The method of claim 1, further comprising:
identifying another storage processor of the plurality of storage processors that has the same accessibility from the host computer as the first storage processor of the plurality of storage processors.

21. The method of claim 1, further comprising:
transmitting a notification to the host computer, wherein the notification indicates that ownership of the one or more storage units has been modified.

* * * * *